(12) United States Patent
Kawaguchi

(10) Patent No.: US 8,775,733 B2
(45) Date of Patent: Jul. 8, 2014

(54) DISTRIBUTION DESIGN FOR FAST RAID REBUILD ARCHITECTURE BASED ON LOAD TO LIMIT NUMBER OF REDUNDANT STORAGE DEVICES

(75) Inventor: Tomohiro Kawaguchi, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 261 days.

(21) Appl. No.: 13/220,853

(22) Filed: Aug. 30, 2011

(65) Prior Publication Data

US 2013/0054891 A1    Feb. 28, 2013

(51) Int. Cl.
    *G06F 13/00*    (2006.01)
(52) U.S. Cl.
    USPC .......... 711/114; 711/154; 714/6.22; 709/226; 718/105
(58) Field of Classification Search
    USPC .................. 714/6.22; 711/114, 154; 718/105; 709/226
    See application file for complete search history.

(56) References Cited

U.S. PATENT DOCUMENTS

| 5,258,984 | A | * | 11/1993 | Menon et al. ................. 714/6.32 |
| 5,680,539 | A | * | 10/1997 | Jones ........................... 714/6.21 |
| 7,904,749 | B2 |  | 3/2011 | Kawaguchi |
| 2002/0124139 | A1 | * | 9/2002 | Baek et al. ..................... 711/114 |
| 2007/0174671 | A1 |  | 7/2007 | Zohar et al. |
| 2008/0091741 | A1 |  | 4/2008 | Zohar et al. |
| 2008/0313398 | A1 | * | 12/2008 | Koseki .......................... 711/114 |
| 2009/0285098 | A1 | * | 11/2009 | Qi ................................. 370/235 |
| 2010/0088285 | A1 | * | 4/2010 | Hollebeek ..................... 707/667 |
| 2011/0055397 | A1 | * | 3/2011 | Dehaan ......................... 709/226 |
| 2011/0066802 | A1 | * | 3/2011 | Kawaguchi .................... 711/114 |

FOREIGN PATENT DOCUMENTS

| JP | 2000-259359 A | 9/2000 |
| JP | 2003-84923 A | 3/2003 |

OTHER PUBLICATIONS

K. Greenan et al., Mean time to meaningless: MTTDL, Markov models, and storage system reliability, 2nd Workshop on Hot Topics in Storage and File Systems (HotStorage '10), Jun. 22, 2010, Boston MA, USA.

J. Hafner et al., Notes on Reliability Models of Non-MDS Erasure Codes, IBM Technical Report, RJ10391 (A0610-035) Oct. 24, 2006.

* cited by examiner

*Primary Examiner* — Hong Kim
(74) *Attorney, Agent, or Firm* — Mattingly & Malur, PC

(57) ABSTRACT

Exemplary embodiments of the invention provide a distribution design for fast RAID rebuild architecture that avoids the deterioration of the availability/reliability in the distribution architecture. According to one aspect of the invention, a storage system comprises: a data storage unit including a plurality of storage devices; a storage controller including a processor, a memory, and a controller for controlling data transfer between the memory and corresponding storage devices in the data storage unit; and an internal network coupled between the storage controller and the storage devices. Based on loads of the processor of the storage controller and the internal network, the storage controller controls to limit a number of redundant storage devices over which to distribute a write data.

16 Claims, 15 Drawing Sheets

FIG. 5

| Disk# | Capacity | Used Parcels | Pairable Disk# | | | |
|---|---|---|---|---|---|---|
| | | | Line-a | Line-b | Line-c | Line-d |
| 0 | 300[GB] | 1-50 | - | 1,9,13 | 2,10,14 | 3,11,15 |
| 1 | 300[GB] | 1-73 | 0,8,12 | - | 2,10,14 | 3,11,15 |
| 2 | 300[GB] | 1-3 | 0,8,12 | 1,9,13 | - | 3,11,15 |
| 3 | 300[GB] | 1-34 | 0,8,12 | 1,9,13 | 2,10,14 | - |
| 4 | 300[GB] | 1-117 | - | 5,17,21 | 6,18,22 | 7,19,23 |
| 5 | 300[GB] | 1-28 | 4,16,20 | 5,17,21 | 6,18,22 | 7,19,23 |
| 6 | 300[GB] | 1-99 | 4,16,20 | 5,17,21 | 6,18,22 | 7,19,23 |
| 7 | 300[GB] | 1-83 | 4,16,20 | 5,17,21 | 6,18,22 | 7,19,23 |
| 8 | 600[GB] | 1-10 | - | 1,9,13 | 2,10,14 | 3,11,15 |
| 9 | 600[GB] | 1-7 | 0,8,12 | - | 2,10,14 | 3,11,15 |
| 10 | 600[GB] | 1-88 | 0,8,12 | 1,9,13 | - | 3,11,15 |
| 11 | 600[GB] | 1-46 | 0,8,12 | 1,9,13 | 2,10,14 | - |
| 12 | 300[GB] | 1-12 | - | 1,9,13 | 2,10,14 | 3,11,15 |
| ... | ... | ... | ... | ... | ... | ... |

Disk Management Table

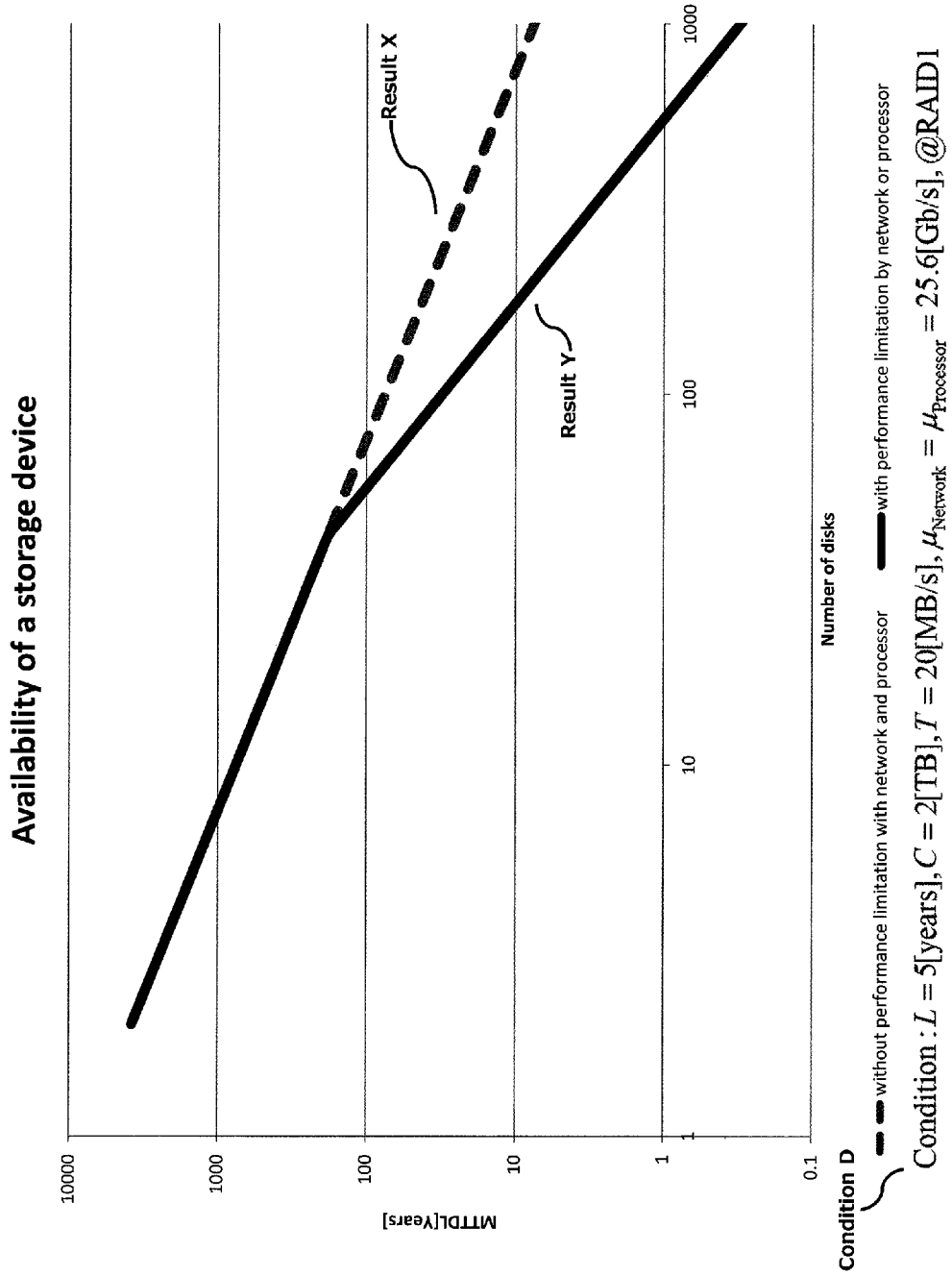

DISTRIBUTION DESIGN FOR FAST RAID REBUILD ARCHITECTURE BASED ON LOAD TO LIMIT NUMBER OF REDUNDANT STORAGE DEVICES

BACKGROUND OF THE INVENTION

The present invention relates generally to storage systems and, more particularly, to a distribution design for fast RAID rebuild architecture.

Currently, storage has a data distribution architecture. See, e.g., U.S. Pat. No. 7,904,749 (based on RAID5 and RAID6) (hereinafter U.S. Pat. No. 7,904,749) and U.S. Patent Application Publication No. 2007/0174671 (based on RAID1) (hereinafter US 2007/0174671). Those systems distribute data to a pool which consists of multiple disks. When rebuild occurs by disk failure, the rebuild process also distributes to the entire pool. Those systems can make the rebuild process run in parallel, thereby shortening the rebuild time. For a disclosure on rebuilding a storage system, see, e.g., U.S. Patent Application Publication No. 2008/0091741.

The storage reliability of a system can be calculated using the Markov model. For a traditional system based on RAID1/RAID5, the formula to calculate the availability/reliability is described in the paper entitled "Mean Time to Meaningless: MTTDL, Markov Models, and Storage System Reliability," by Kevin M. Greenan, James S. Plank & Jay J. Wylie, The 2nd Workshop on Hot Topics in Storage and File Systems (HotStorage2010), Jun. 22, 2010, Boston Mass., USA. That formulas can be expanded for the distribution architecture such as those disclosed in U.S. Pat. No. 7,904,749 and US 2007/0174671.

FIG. 14 illustrates a method to solve the MTTDL (Mean Time to Data Loss) of the distribution architecture. The method involves the use of Model A, Formula B, and Definition C. Details of the method are found in the paper entitled "Notes on Reliability Models for Non-MDS Erasure Codes," by James Lee Hafner & K. K. Rao, IBM Tech. Rep. RJ-10391, IBM, Oct. 24, 2006. Formula B is from Model A. Model A and Definition C mean the following. First, the state $F_0$ changes to $F_1$ at rate $n\lambda$. At $F_0$, there is no disk failure. Each disk failure occurs at rate $\lambda$. There are n healthy disks. Second, the state $F_1$ changes to $F_2$ at rate $(n-1)\lambda$. At $F_1$, there is one disk failure. Each disk failure occurs at rate $\lambda$. There are n−1 healthy disks. (One disk is broken; the disk cannot be broken more.) Third, the state $F_1$ changes to $F_0$ at rate p. p depends on the pace of the rebuild process. Hence, the process is limited by worst performance parts for rebuild. In general, processor(s), network, and disks work in the rebuild process. As such, p is described as $p=\min((n-1)\mu_{Disk}, \mu_{Processor}, \mu_{Network})$. $\mu_j$ depends on the throughput performance of component j. The distribution architecture has multiple rebuild processes, so that the rebuild rate is proportional to the number of healthy disks n−1. Fourth, the state $F_2$ cannot change to another status. Because $F_2$ indicates two disk failure, it has data loss (cannot be rebuilt).

FIG. 15 is a plot of the availability of a storage device illustrating the relation of the number of disks versus the MTTDL. Result Y is calculated from Formula B and Condition D. Result X is calculated from Formula B and Condition D, but with $\mu_{Processor}=\mu_{Network}=\infty$. In this condition, at an environment which has more than dozens of disks, Result Y is lower than Result X. It means that the distribution makes the availability worse in the massive disk environment. Because the throughput performance of all disks for the rebuild process is limited by network or processor bandwidth, the effect by multiplication by distribution of disks is saturated.

BRIEF SUMMARY OF THE INVENTION

Exemplary embodiments of the invention provide a distribution design for fast RAID rebuild architecture that avoids the deterioration of the availability/reliability in the distribution architecture. The storage sets the limitation of the distribution. For example, the total disk throughput performance is slower than the other bandwidths, such as network bandwidth and processor bandwidth. The storage knows the configuration and performance of each of the components. The storage calculates a delimitation of distribution of disks and sets a pairable disk list for each disk. The maximum number in the list is limited by the delimitation. The members of the list are selected from other disks in a pool. When rebuild occurs, a data rebuild target is selected from the members in the list. In this way, the distributed RAID architecture reduces the availability/reliability when the total disk throughput is higher than the interconnect bandwidth or the processor bandwidth.

In accordance with an aspect of the present invention, a storage system comprises: a data storage unit including a plurality of storage devices; a storage controller including a processor, a memory, and a controller for controlling data transfer between the memory and corresponding storage devices in the data storage unit; and an internal network coupled between the storage controller and the storage devices. Based on loads of the processor of the storage controller and the internal network, the storage controller controls to limit a number of redundant storage devices over which to distribute a write data.

In some embodiments, the storage controller controls data allocation so that a distribution of storage devices is not saturated by the loads of the processor of the storage controller and the internal network in rebuilding the data. The MTTDL (Mean Time to Data Loss) is calculated by the storage controller. The storage controller reduces the number of storage devices to distribute the write data for redundancy when the load of the internal network or the load of the storage controller increases. The storage controller calculates network bandwidth of the internal network and processor bandwidth of the processor in a rebuild process, based on performance and number of each component of the storage system except the storage devices, and calculates a maximum distribution number of redundant storage devices over which to distribute the write data based on the network bandwidth and the processor bandwidth. The storage controller compares the newly calculated maximum distribution number with a previous maximum distribution number and, if (i) the two maximum distribution numbers are different or (ii) if a current number of storage devices is different from a previous number of storage devices in the storage system and the current number is higher than the newly calculate maximum distribution number, then changes a list of pairable storage devices so that a number of pairable storage devices on the list is equal to the newly calculated maximum distribution number. The list of pairable storage devices is changed to minimize migration time and capacity for migrating data according to the pairable storage devices.

In specific embodiments, the maximum distribution number is formulated as $$N_{MAX} = \left\lfloor \frac{\varpi_r}{P_{disk}} \right\rfloor$$

$$\varpi_r = \min\left(\frac{n_k P_k}{\eta_k} \;\Big|\; k : \text{each component except disk at configuration } r\right)$$

where $N_{MAX}$ is the maximum distribution number, $n_i$ is a number of the component i for the rebuild process, $P_i$ is the performance of the component i for the rebuild process, $\eta_i$ is a number of times to access the component i for the rebuild process, and r is a RAID level. The storage controller performs rebuild control for each chunk in a broken RAID group, and wherein the rebuild control includes selecting pairable storage devices from non-failure storage devices, getting parcels of the non-failure storage devices and establishing a new chunk, copying data from the broken chunk to the new chunk, and recovering lost data for the new chunk. The components include the memory, the storage controller, and the data transfer controllers involved in the rebuild control. An effective throughput performance of each component is equal to a performance divided by a number of times of data transfer for the component during the rebuild control. An effective throughput is a minimum value of the effective throughput performances of all the components.

In some embodiments, the storage controller performs rebuild control for each chunk in a broken RAID group, and wherein the rebuild control includes selecting storage devices from a list of pairable storage devices for a storage device for the unrecovered parcel, and getting a parcel from each of the selected storage devices; reading data of the parcels of the selected storage devices; and recovering lost data from the read data and storing the recovered data to a newly allocated parcel in place of the unrecovered parcel. The components include the memory, the storage controller, and the data transfer controllers involved in the rebuild control. An effective throughput performance of each component is equal to a performance divided by a number of times of data transfer for the component during the rebuild control. An effective throughput is a minimum value of the effective throughput performances of all the components.

In specific embodiments, the storage controller performs rebuild control for each chunk in a broken RAID group, and wherein the rebuild control includes selecting one storage device from a list of pairable storage devices for a storage device for the unrecovered parcel, and getting a parcel from the one selected storage device; reading data of the parcels of the one selected storage device; and recovering lost data from the read data and storing the recovered data to a newly allocated parcel in place of the unrecovered parcel. The components include the memory, the storage controller, and the data transfer controllers involved in the rebuild control. An effective throughput performance of each component is equal to a performance divided by a number of times of data transfer for the component during the rebuild control. An effective throughput is a minimum value of the effective throughput performances of all the components.

In some embodiments, the storage devices include chunks which have different redundancy levels or architectures. An effective throughput performance is calculated as follows $$\varpi_{mixed} = \sum_{i}^{ALL} \rho_i \varpi_i$$

$\rho_r$: rate of number of used chunks which is r.
i: redundant level or architecture.

Another aspect of the invention is directed to a method of distributing data in a storage system which has a data storage unit including a plurality of storage devices; a storage controller including a processor, a memory, and a plurality of data transfer controllers for controlling data transfer between the memory and corresponding storage devices in the data storage unit; and an internal network coupled between the storage controller and the storage devices. The method comprises: based on loads of the processor of the storage controller and the internal network, controlling to limit a number of redundant storage devices over which to distribute a write data.

These and other features and advantages of the present invention will become apparent to those of ordinary skill in the art in view of the following detailed description of the specific embodiments.

BRIEF DESCRIPTION OF THE DRAWINGS

FIG. 5 illustrates an example of a Disk Management Table in the memory of FIG. 4.

FIG. 15 is a plot of the availability of a storage device illustrating the relation of the number of disks versus the MTTDL.

DETAILED DESCRIPTION OF THE INVENTION

Figure 1:
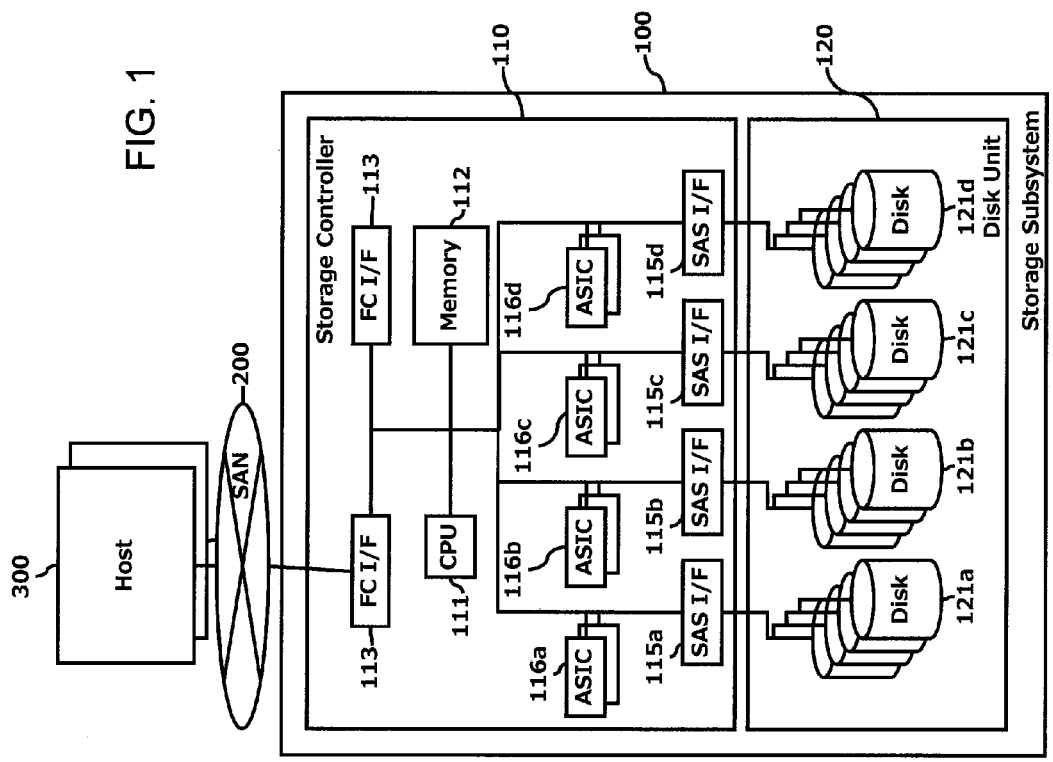
FIG. 1 illustrates an example of a hardware configuration of an information system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for a distribution design for fast RAID rebuild architecture.

First Embodiment

The first embodiment of this invention is based on the second embodiment of U.S. Pat. No. 7,904,749, which is incorporated herein by reference in its entirety. In this embodiment, the RAID level is 5, but it can be applied to RAID 6 and RAID 4 in a similar way.

FIG. 1 illustrates an example of a hardware configuration of an information system in which the method and apparatus of the invention may be applied. A storage subsystem 100 is connected via a SAN (storage area network) to host computers 300. The storage subsystem 100 includes a storage controller 110 and a disk unit 120. The storage controller 110 has a CPU 111 that controls the storage subsystem 100 and runs the programs and uses the tables stored in a memory 112. The memory 112 stores data in addition to programs and tables. A channel interface 113 is provided for interfacing with the SAN 200. The storage controller 110 includes disk interfaces 115a to 115d that are linked to disks 121a to 121d in the disk unit 120. The storage controller 110 further includes data transfer controllers 116a to 116d configured to transfer data between the memory 112 and the disks 121, and to calculate using the data to generate parity data or recovery data. The disk unit 120 provides nonvolatile disks 121 for storing data.

Figure 2:
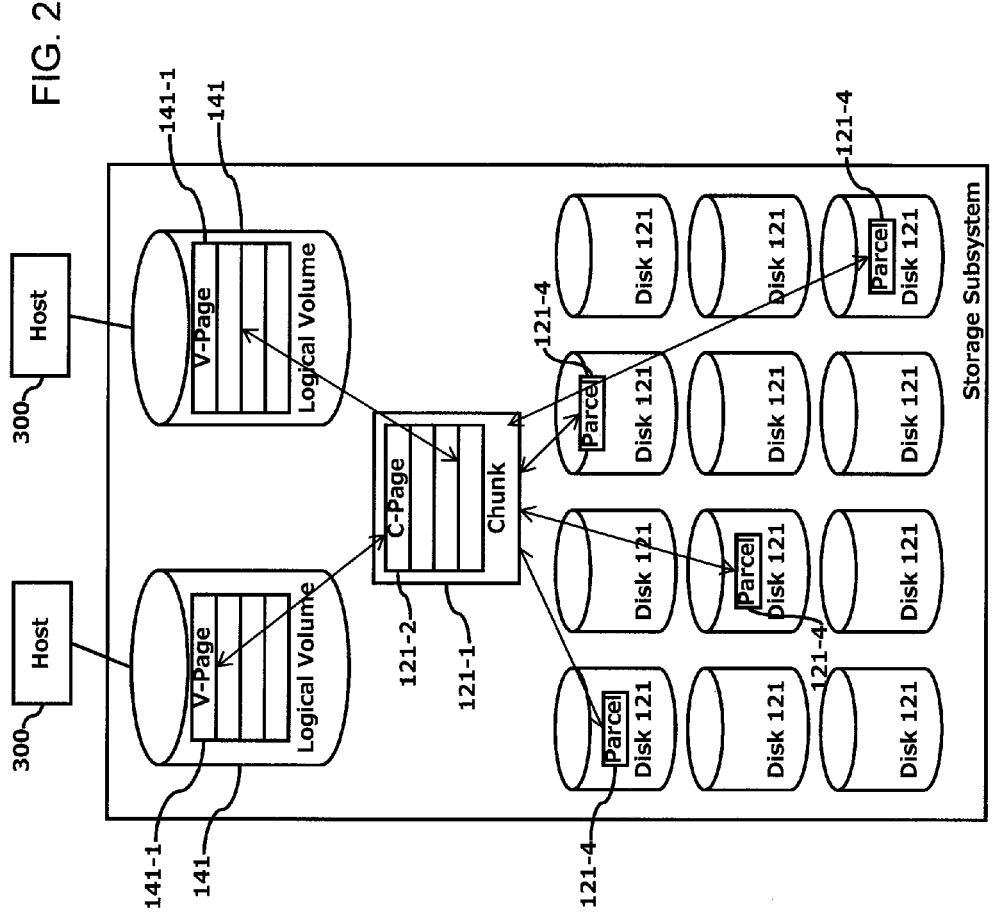
FIG. 2 illustrates an example of a logical configuration of the invention applied to the architecture of FIG. 1.

FIG. 2 illustrates an example of a logical configuration of the invention applied to the architecture of FIG. 1. The storage subsystem 100 provides logical volumes 141. Each logical volume 141 has virtual volume pages 141-1. Each logical volume 141 is connected to a host computer 300. Each disk 121 is divided into parcels 121-4. The storage subsystem 100 makes chunks 121-1. Each chunk includes parcels 121-4 from the disks 121. Each chunk has data and redundant (e.g., parity or mirrored) data. If data in one parcel of one chunk is lost, the storage subsystem 100 can regenerate the data from data and redundant data stored in the other parcels of the chunk and store the regenerated data to other parcel of another healthy disk 121. Each chunk is divided into capacity pool pages 121-2. A capacity pool page 121-2 is allocated to a virtual volume page 141-1 when write I/O or allocation requirement occurs to the virtual volume page.

Figure 3:
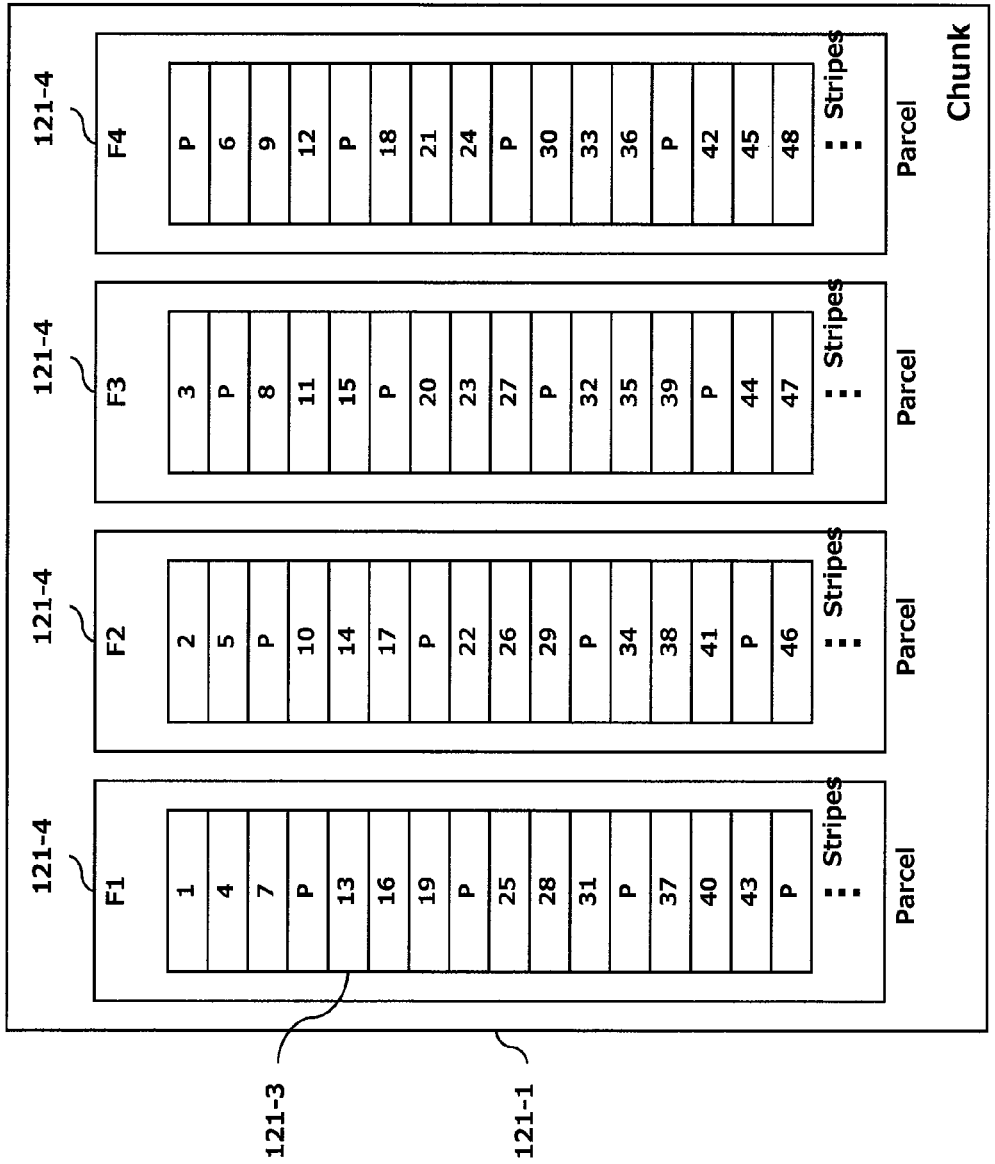
FIG. 3 illustrates an example of a logical configuration of a chunk according to a first embodiment of the invention.

FIG. 3 illustrates an example of a logical configuration of a chunk 121-1 according to a first embodiment of the invention. Each disk is divided into plural parcels 121-4. Each parcel 121-4 is divided into plural capacity pool stripes 121-3. Four parcels 121-4 make up a chunk 121-1. Each of the four parcels 121-4 in a chunk 121-1 belongs to one disk 121 connected to different disk interfaces 115a-115d to avoid two points of failure. The selection of these four parcels 121-4 follows the evenly distributed algorithm. Each chunk 121-1 has plural capacity pool stripes 121-3 that make up a redundant array. In a stripe column in a chunk are data and parity data. The parity data is generated from the data.

Figure 4:
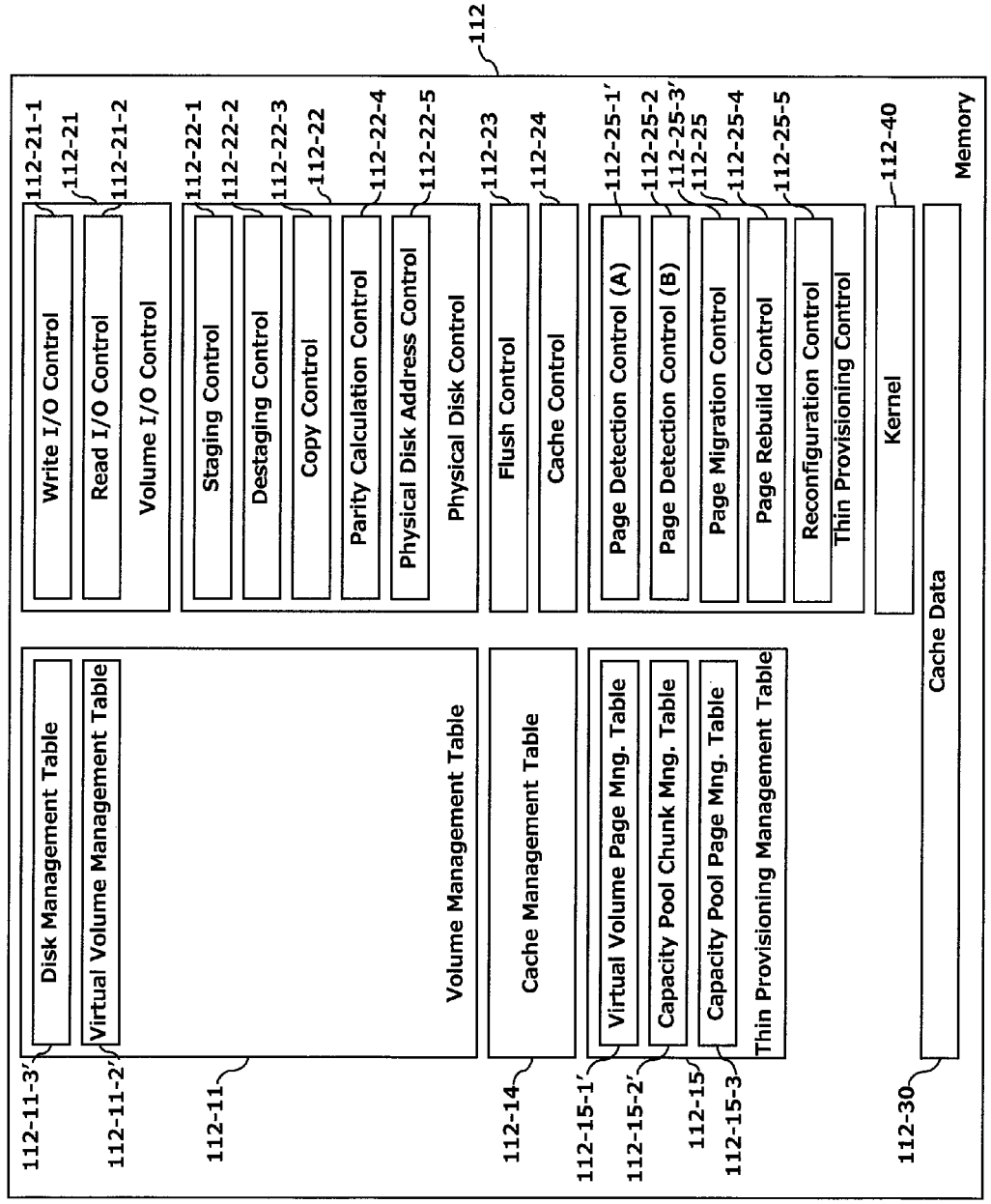
FIG. 4 illustrates an example of a memory in the storage subsystem of FIG. 1 according to the first embodiment.

FIG. 4 illustrates an example of a memory 112 in the storage subsystem 100 of FIG. 1 according to the first embodiment. The memory 112 includes a Volume Management Table 112-11 that has a Disk Management Table 112-11-3' (FIG. 5) for the physical structure management of the disks 121, and a Virtual Volume Management Table 112-11-2' for volume configuration management (FIG. 34 of U.S. Pat. No. 7,904,749). A Cache Management Table 112-14 (FIG. 8 of U.S. Pat. No. 7,904,749) is provided for managing the cache data area 112-30 and for LRU/MRU (Least Recently Used/Most Recently Used) management. A Thin Provisioning Management Table 112-15 includes a Virtual Volume Page Management Table 112-15-1' (FIG. 35 of U.S. Pat. No. 7,904,749) for reference management from a partition of a virtual volume to a partition of a capacity pool, a Capacity Pool Chunk Management Table 112-15-2' (FIG. 36 of U.S. Pat. No. 7,904,749) for resource management of a capacity pool and reference management from a capacity pool page to a virtual volume page, and a Capacity Pool Page Management Table 112-15-3 (FIG. 7 of U.S. Pat. No. 7,904,749) for resource management of a capacity pool chunk. A Volume I/O Control 112-21 includes a Write I/O Control 112-21-1 (FIG. 17 of U.S. Pat. No. 7,904,749) that runs by a write I/O requirement and receives write data and stores to the cache data area 112-30 via the channel interface 113, and a Read I/O Control 112-21-2 (FIG. 18 of U.S. Pat. No. 7,904,749) that runs by a read I/O requirement and sends read data from the cache data area 112-30 via the channel interface 113.

A Physical Disk Control 112-22 includes a Staging Control 112-22-1 (FIG. 19 of U.S. Pat. No. 7,904,749) that transfers data from the disks 121 to the cache data area 112-30, a Destaging Control 112-22-2 (FIG. 20 of U.S. Pat. No. 7,904,749) that transfers data from the cache data area 112-30 to the disks 121, a Copy Control 112-22-3 (FIG. 21 of U.S. Pat. No. 7,904,749) that copies data in the cache data area 112-30, a Parity Calculation Control 112-22-4 (FIG. 22 of U.S. Pat. No. 7,904,749) that calculates redundant data stored in the disks 121 and recovers lost data in the disks 121, and a Physical Disk Address Control 112-22-5 (FIG. 23 of U.S. Pat. No. 7,904,749) that calculates and resolves the physical address of capacity pool data. The memory 112 further includes a Flush Control 112-23 (FIG. 24 of U.S. Pat. No. 7,904,749) that periodically flushes dirty data from the cache data area 112-30 to the disks 121, and a Cache Control 112-24 (FIG. 25 of U.S. Pat. No. 7,904,749) that finds cached data in the cache data area 112-30 and allocates a new cache area in the cache data area 112-30. A Thin Provisioning Control 112-25 includes a Page Detection Control (A) 112-25-1' (FIG. 39 of U.S. Pat. No. 7,904,749) that searches a capacity pool page referred to by a virtual volume page (If no capacity pool page is allocated to the virtual volume page, it allocates a new capacity pool page to the virtual volume page.), another Page Detection Control (B) 112-25-2 (FIG. 27 of U.S. Pat. No. 7,904,749) that searches a capacity pool page referred to by a virtual volume page (If no capacity pool page is allocated to the virtual volume page, it answers a "zero reserved page" address.), and a Page Rebuild Control 112-25-4 (see FIG. 6) that migrates capacity pool pages to other capacity pages when disk failure occurs. The Thin Provisioning Control 112-25 further includes a Page Rebuild Control 112-25-4 (FIG. 6) and a Reconfiguration control 112-25-5 (FIG. 7). The memory 112 includes a kernel 112-40 that controls the schedules of running program and supports a multi-task environment. If a program waits for an ack (acknowledgement), the CPU 111 changes to run another task (e.g., data transfer waiting from the disk 121 to the cache data area 112-30). The cache data area 112-30 stores read and write cache data, and is separated into plural cache slots.

FIG. 5 illustrates an example of a Disk Management Table 112-11-3' in the memory 112 of FIG. 4. The Disk Management Table 112-11-3' includes columns of the Disk Number 112-11-3-1 representing the ID of the disks 121, Disk Capacity 112-11-3-4 representing the capacity of the disk 121, Used Parcel Number 112-11-3-3 representing the list of used capacity pool parcels, and pairable disk lists 112-11-3'-4(a-d). Each pairable disk list 112-11-3'-4(a-d) is provided for a corresponding disk interface 115a-115d. Each list stores disk numbers which are connected to the disk interface. The number of a member in the pairable disk is calculated and the member is set by a reconfiguration control 112-25-5.

Figure 6:
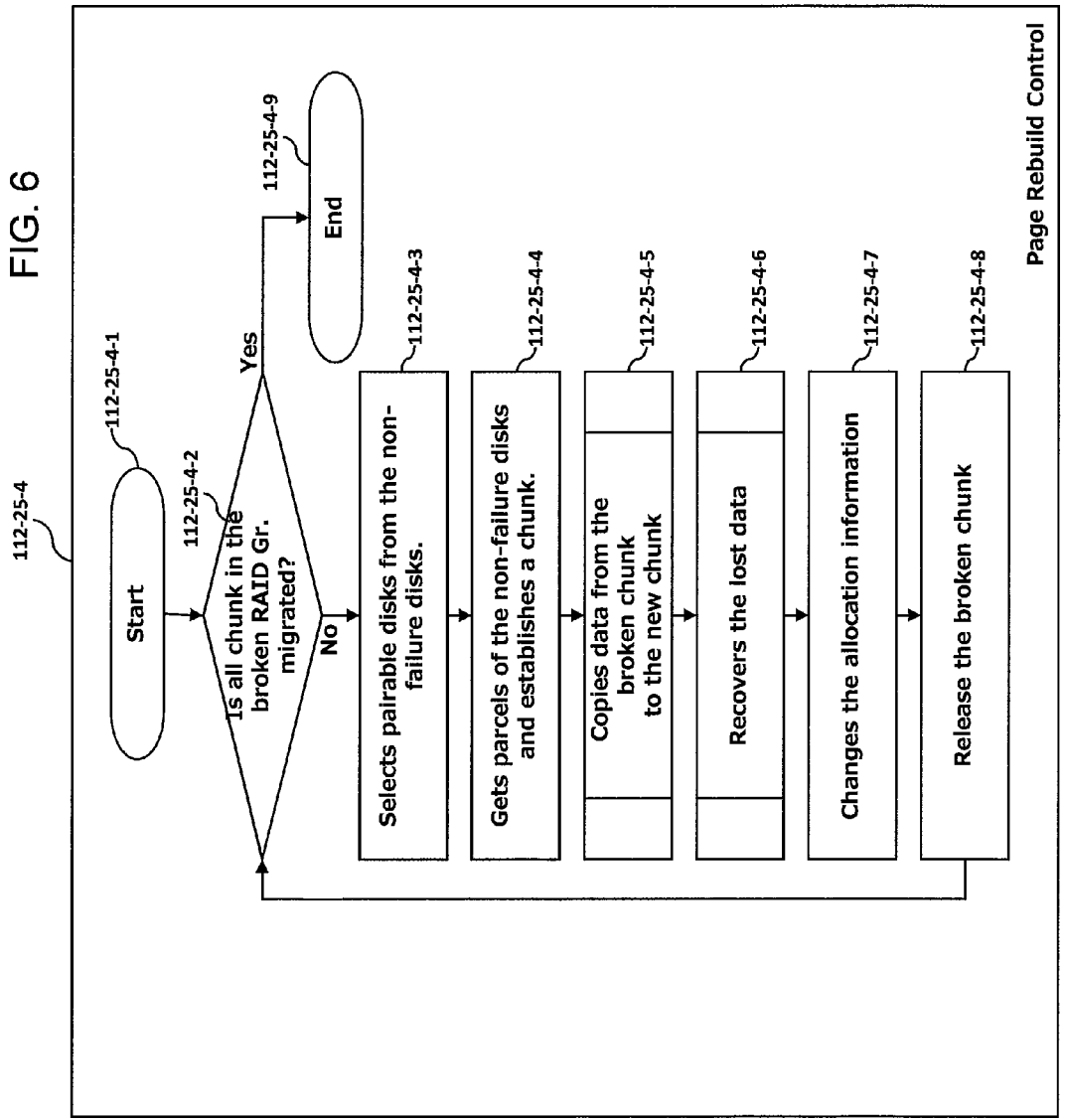
FIG. 6 illustrates an example of a process flow of the Page Rebuild Control in the memory of FIG. 4 according to the first embodiment.
Figure 7:
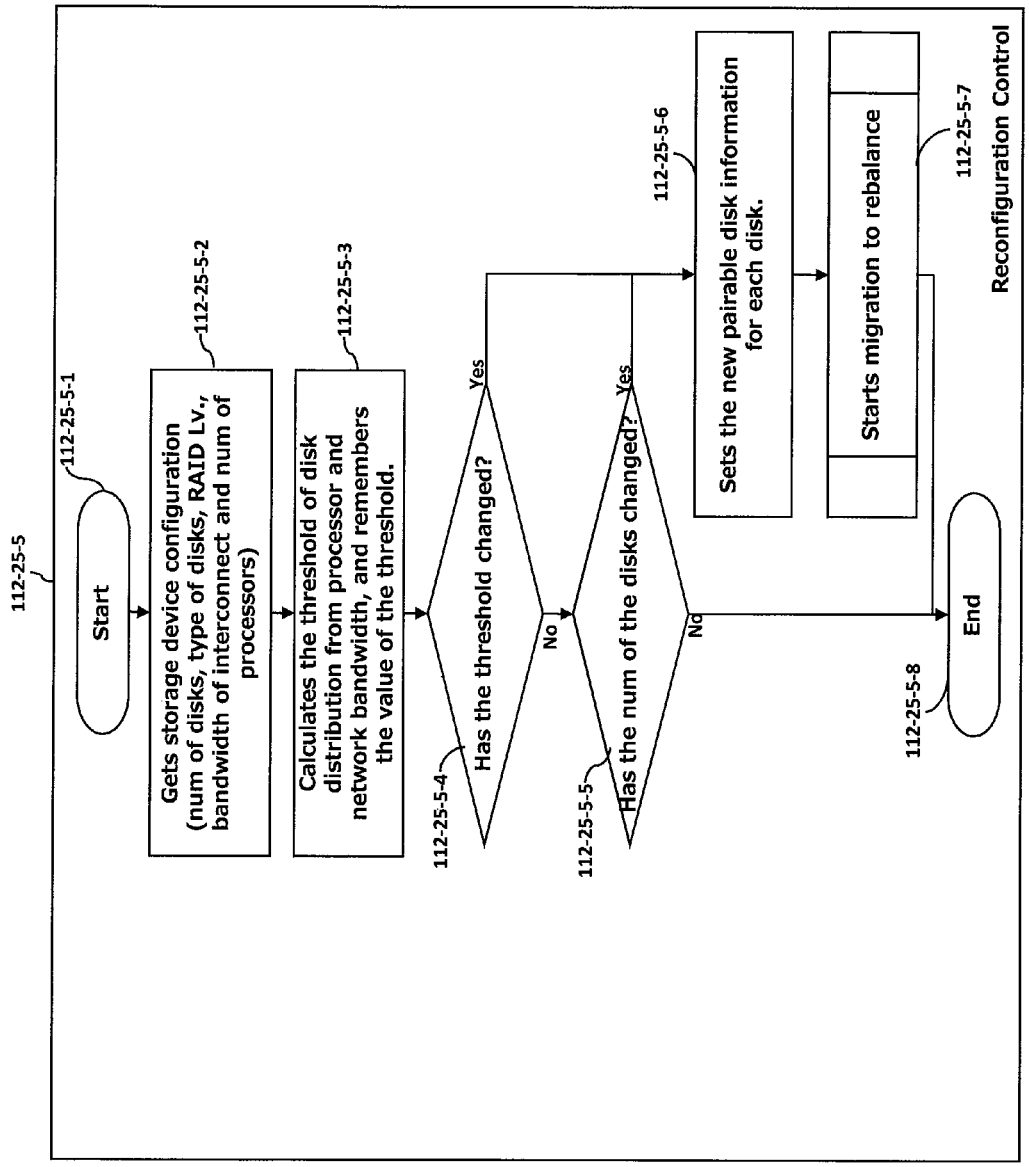
FIG. 7 illustrates an example of a process flow of the Reconfiguration Control in the memory of FIG. 4.

FIG. 6 illustrates an example of a process flow of the Page Rebuild Control 112-25-4 in the memory 112 of FIG. 4 according to the first embodiment. This program runs when disk failure occurs. The program starts at 112-25-4-1. In step 112-25-4-2, the program repeats this process until no parcel that belongs to the broken disk remains (i.e., all chunks in the broken RAID group are migrated). In step 112-25-4-3, the program selects a disk, refers to the Disk Management Table 112-11-3' to find lists of non-failure pairable disks of the selected disk, and selects a disk from each list. In step 112-25-4-4, the program gets a parcel from each of the disks selected in step 112-25-4-3, and establishes a new chunk, and registers it into the Capacity Pool Chunk Management Table 112-15-2'. In step 112-25-4-5, the program calls the Copy Control 112-22-3 to copy the chunk data from the broken chunk to the new chunk. In step 112-25-4-6, the program calls the Parity Calculation Control 112-22-4 to generate or recover the lost data. In step 112-25-4-7, the program changes the Virtual Volume Page Management Table 112-15-1' to refer to the new page in the newly allocated capacity pool chunk, thereby altering the allocation information. In step 112-25-4-8, the program releases the broken chunk. The program ends at 112-25-4-9.

FIG. 7 illustrates an example of a process flow of the Reconfiguration Control 112-25-5 in the memory 112 of FIG. 4. This program runs when the configuration of storage subsystem 100 changes or rebuild process completes. The program starts at 112-25-5-1. In step 112-25-5-2, the program gets the configuration of the Storage Subsystem 100 (e.g. number of disks, type of disks, RAID level, connected-disks to each disk interface 115, number of data transfer controllers 116, connected data transfer controllers 116 to each disk interface 115, bandwidth of memory 112, and calculation throughput performance of data transfer controller 116). The program remembers the number of the disks. In step 112-25-5-3, the program calculates the network bandwidth and processor bandwidth for a rebuild process from the performance and the number of each component except the disks, and calculates the maximum number of disks to distribute the rebuild process. The program remembers the maximum number. The maximum distribution number is formulated as below $$N_{MAX} = \left\lfloor \frac{\varpi_r}{P_{disk}} \right\rfloor$$

$$\varpi_r = \min\left(\frac{n_k P_k}{\eta_k} \mid k: \text{ each component except disk at configuration } r\right)$$

where $N_{MAX}$ is the maximum distribution number of disks, $n_i$ is the number of the component i for rebuild process, $P_i$ is the performance of the component i for the rebuild process (as will be described in detail herein below), $\eta_i$ is the number of times to access the component i for rebuild process, and r is the RAID level or architecture.

When the program calculates $\bar{\omega}_r$, calculation for every component may not be required because it does not actually affect the result. Either $\bar{\omega}_r$ of a processor or a network may be ignored for calculation, if it is determinably known that a value of one is larger than the other based on the system design. For example, a storage system may have many high-performance processors but a low-speed network, or a storage system may be used for processing data that require relatively short operation time for processor(s). In these cases, the program does not actually need to measure and calculate $n_{Processor}P_{Processor}/\eta_{Processor}$ because the $n_{Network}P_{Network}/\eta_{Network}$ would be dominant.

In step 112-25-5-4, the program compares the previous maximum distribution number of disks and the newly calculated maximum distribution number in step 112-25-5-3; the current number of disks is over the maximum distribution number of disks. If the two maximum distribution numbers are different, the program proceeds to step 112-25-5-6. If not, the program proceeds to step 112-25-5-5. In step 112-25-5-5, the program compares the previous number of disks and the current number of disks obtained in step 112-25-5-2. If the numbers are different and the current number is over the newly calculated maximum distribution number of disks, the program proceeds to step 112-25-5-6. If not, the program ends at 112-25-5-8. In step 112-25-5-6, the program changes the pairable disk lists 112-11-3'-4 in the Disk Management Table 112-11-3' for each drive. The number of the member in each list is the maximum distribution number. The changing of the member can be decided such that the migration time and capacity is minimized. In step 112-25-5-7, the program calls the Page Migration Control 112-25-3' to migrate chunks for which the chunk configuration should be reconfigured by the changing of the Disk Management Table 112-11-3' in step 112-25-5-6. The program ends at 112-25-5-8.

Figure 8:
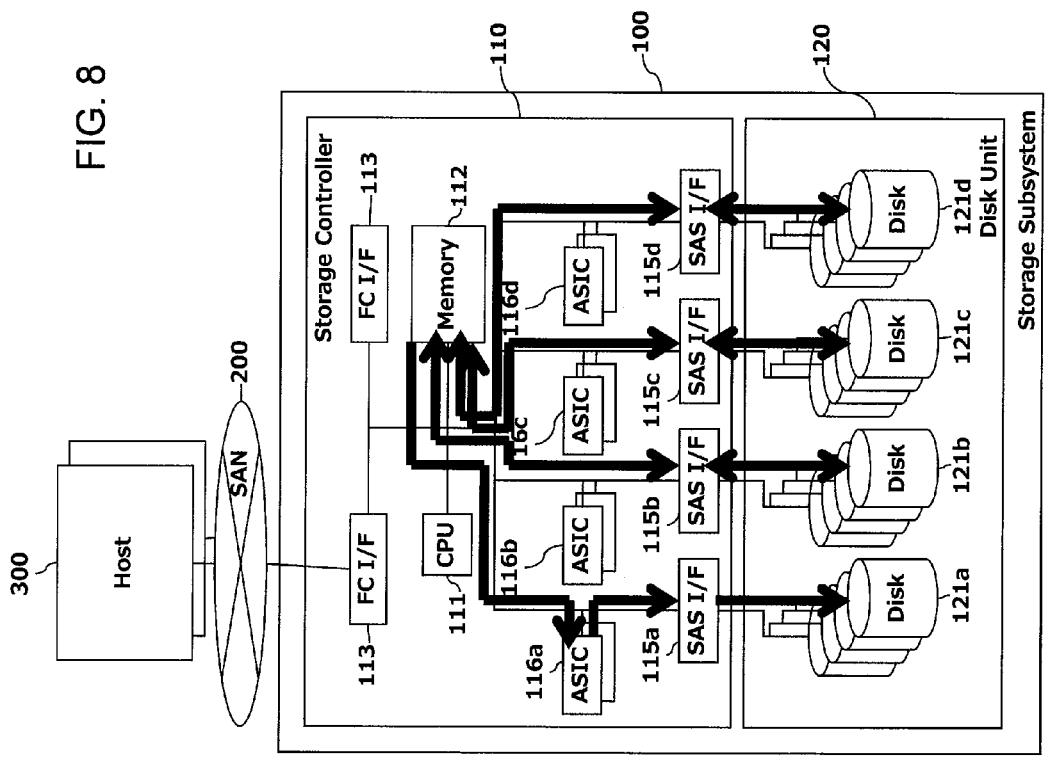
FIG. 8 Illustrates an example of the data flow by the rebuild process when one disk has failed, according to the first embodiment.

FIG. 8 Illustrates an example of the data flow by the rebuild process about one chunk when one disk 121a has failed, according to the first embodiment. The data flow is as follows. The data stored in disks 121b, 121c and 121d is transferred to the memory 112 via corresponding disk controllers 116b, 116c and 116d. The data stored in the memory 112 from disks 121b, 121c and 121d is transferred to data transfer controllers 116a, and parity data is generated from the data. The generated parity data is transferred to a disk 121a via a disk controller 116a. The data stored in the memory 112 from disks 121b, 121c and 121d is transferred to disks 121b, 121c and 121d via corresponding disk controllers 116b, 116c and 116d. The calculation of the effective throughput performance (details of the calculation in step 112-25-5-3) is as follows. The disk controllers 116b, 116c and 116d each transfer twice the capacity of the parcel, so that the effective throughput of each is one half of that performance. The memory 112 transfers nine times of the parcel, so that the effective throughput is one ninth of that performance. The transfer controller 116a can distribute the data transferred, so that the effective throughput is total transfer controller 116a number multiples of that performance. The disk controller 116a transfers the same capacity of the parcel, so that the effective throughput is of that performance. The whole effective throughput is the minimum value of the aforesaid effective performance of each component.

Second Embodiment

The second embodiment is based on the first embodiment. The following will focus on the differences between the two embodiments.

Figure 9:
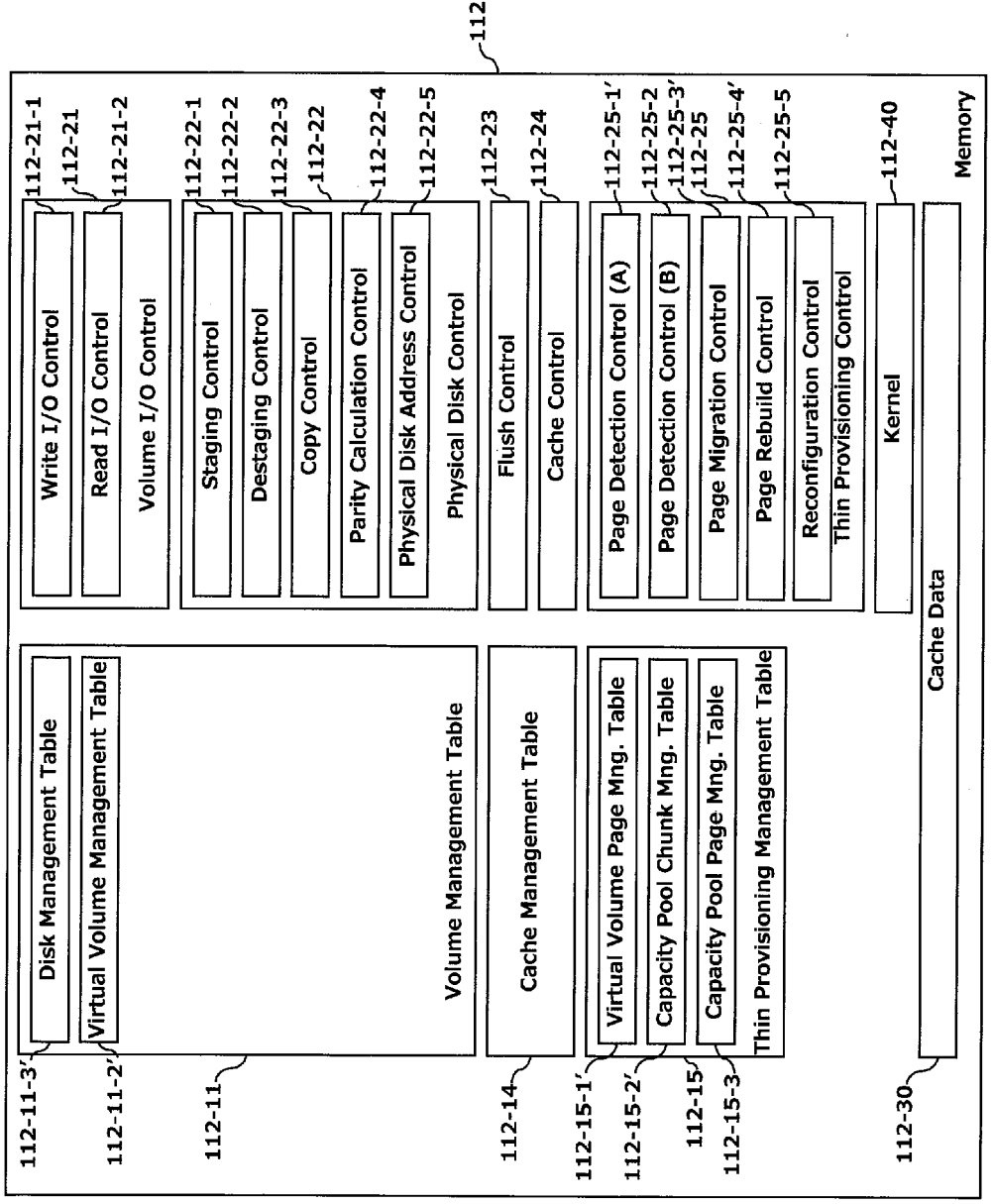
FIG. 9 illustrates an example of a memory in the storage subsystem of FIG. 1 according to the second embodiment.

FIG. 9 illustrates an example of a memory 112 in the storage subsystem 100 of FIG. 1 according to the second embodiment. Only changes from the first embodiment of FIG. 4 will be discussed. In FIG. 9, a Page Rebuild Control 112-25-4' (FIG. 10) is provided in place of the Page Rebuild Control 112-25-4 of FIG. 4 for the rebuild data in a parcel of broken disk.

Figure 10:
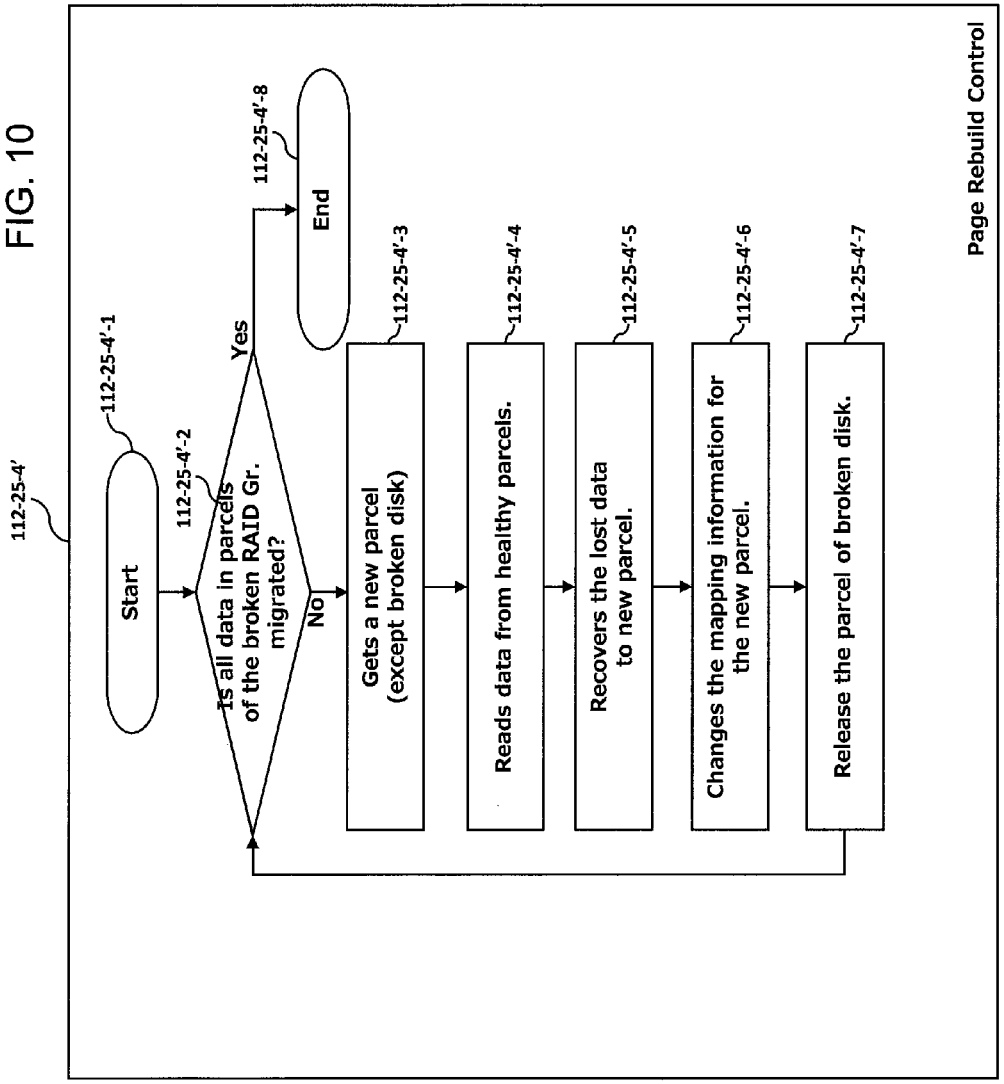
FIG. 10 illustrates an example of a process flow of the Page Rebuild Control in the memory of FIG. 9.

FIG. 10 illustrates an example of a process flow of the Page Rebuild Control 112-25-4' in the memory 112 of FIG. 9. This program runs when disk failure occurs. The program starts at 112-25-4-1. In step 112-25-4'-2, the program repeats this process until no parcel that belongs to the broken disk remains (i.e., all chunks in the broken RAID group are migrated). In step 112-25-4'-3, the program selects an unrecovered parcel of a broken disk, refers to the Capacity Pool Chunk Management Table 112-15-2' to find parcels with which the unrecovered parcel establishes a chunk, refers to each column of a found disk for the unrecovered parcel in the Disk Management Table 112-11-3' to list the pairable disks for the found disk, and selects a disk from each list of pairable disks. Then the program gets a parcel from each of the disks selected. In step 112-25-4'-4, the program reads data of the parcels of the healthy disks in the chunk. In step 112-25-4'-5, the program calls the Parity Calculation Control 112-22-4 to generate or recover the lost data from data obtained from the healthy disks. Then the program stores the recovered data to the newly allocated parcel. In step 112-25-4'-6, the program changes the Capacity Pool Chunk Management Table 112-15-2' to change the chunk configuration by using the newly allocated parcel in place of the old parcel that belongs to the broken disk (i.e., changing the mapping information for the new parcel). In step 112-25-4'-7, the program removes the information in the used parcel information 112-11-3-3 for the old parcel that belongs to the broken disk. The program ends at 112-25-4'-8.

Figure 11:
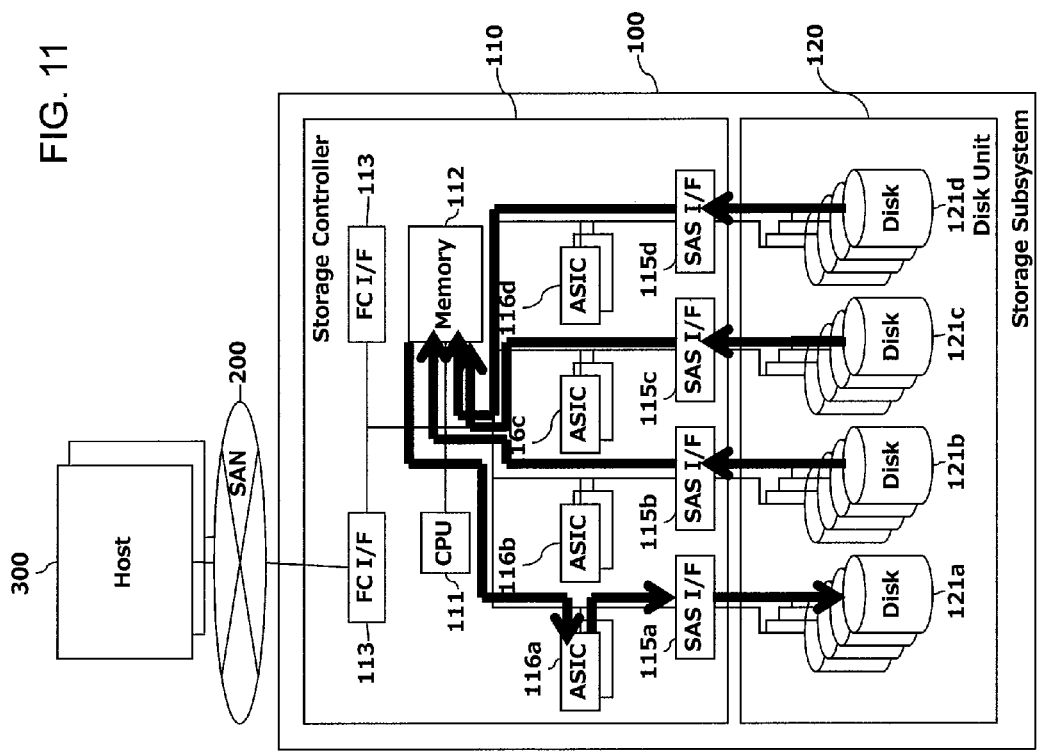
FIG. 11 illustrates an example of the data flow by the rebuild process when one disk has failed, according to the second embodiment.

FIG. 11 illustrates an example of the data flow by the rebuild process about one chunk when one disk 121a has failed, according to the second embodiment. The data flow is as follows. The data stored in disks 121b, 121c and 121d is transferred to the memory 112 via corresponding disk controllers 116b, 116c and 116d. The data stored in the memory 112 from disks 121b, 121c and 121d is transferred to data transfer controller 116a, and parity data is generated from the data. The generated parity data is transferred to a disk 121a via a disk controller 116a. The calculation of the effective throughput performance (details of the calculation in step 112-25-5-3) is as follows. The disk controllers 116b, 116c and 116d each transfer twice the capacity of the parcel, so that the effective throughput of each is half of that performance. The memory 112 transfers six times of the parcel, so that the effective throughput is a sixth part of that performance. The transfer controller 116a can distribute the data transferred, so that the effective throughput is total transfer controller 116a number multiples of that performance. The disk controller 116a transfers the same capacity of the parcel, so that the effective throughput is of that performance. The whole effective throughput is the minimum value of the aforesaid effective performance of each component.

Third Embodiment

The third embodiment is based on the second embodiment. The following will focus on the differences between the two embodiments. In this embodiment, the RAID level is 10, but it can be applied to RAID 1 in a similar way.

Figure 12:
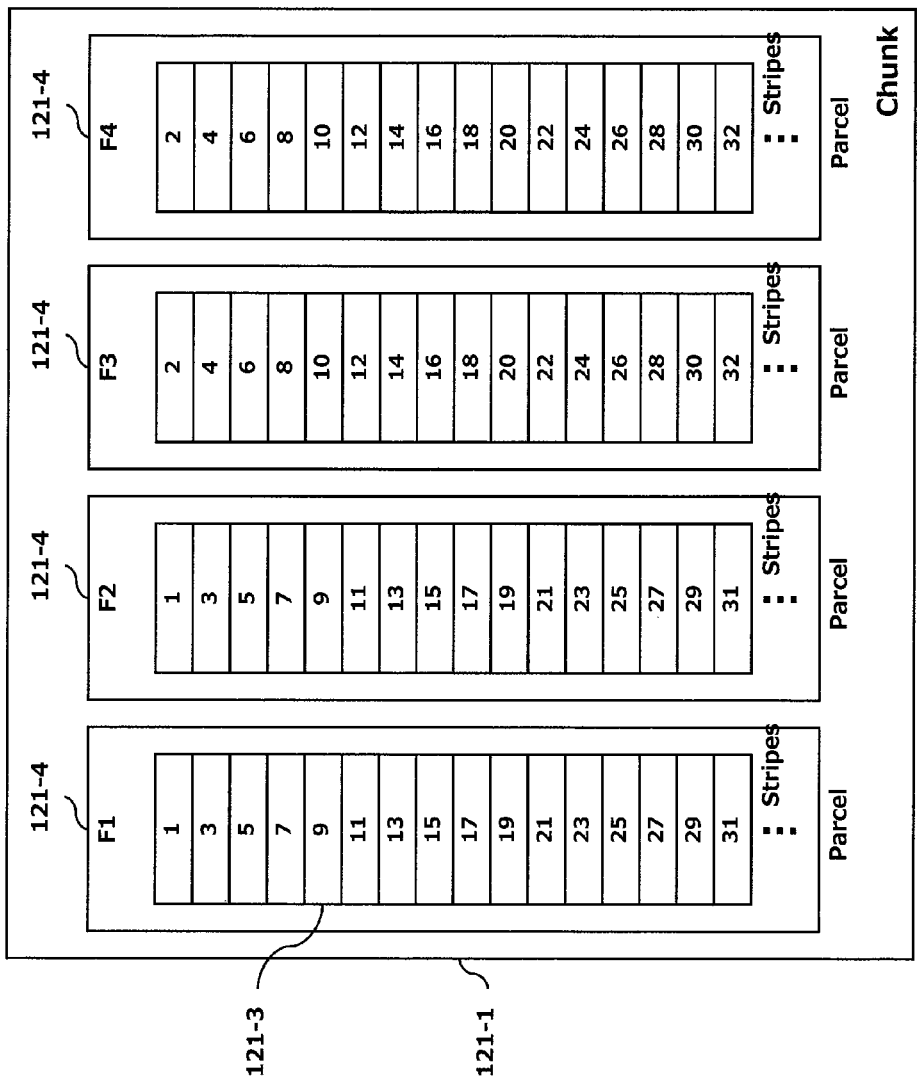
FIG. 12 illustrates an example of the logical configuration of a chunk according to the third embodiment.

FIG. 12 illustrates an example of the logical configuration of a chunk 121-1 according to the third embodiment. Each disk is divided into plural parcels 121-4. Each parcel 121-4 is divided into plural capacity pool stripes 121-3. Four parcels 121-4 make up a chunk 121-1. Each of the four parcels 121-4 in a chunk 121-1 belongs to one disk 121 connected to different disk interfaces 115a-115d to avoid two points of failure. The selection of these four parcels 121-4 follows the evenly distributed algorithm. Each chunk 121-1 has plural capacity pool stripes 121-3 that make up a redundant array. In a stripe column in a chunk are data and mirrored data (as opposed to parity data in the first embodiment shown in FIG. 3).

Figure 13:
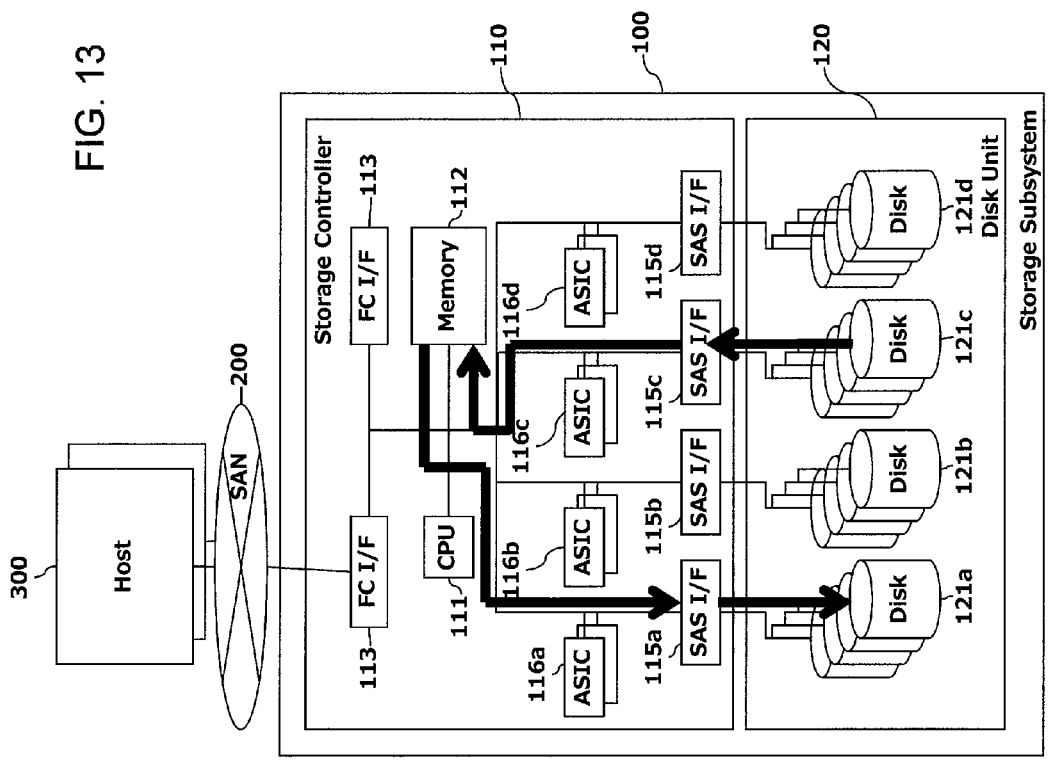
FIG. 13 illustrates an example of the data flow by the rebuild process when one disk has failed, according to the third embodiment.
Figure 14:
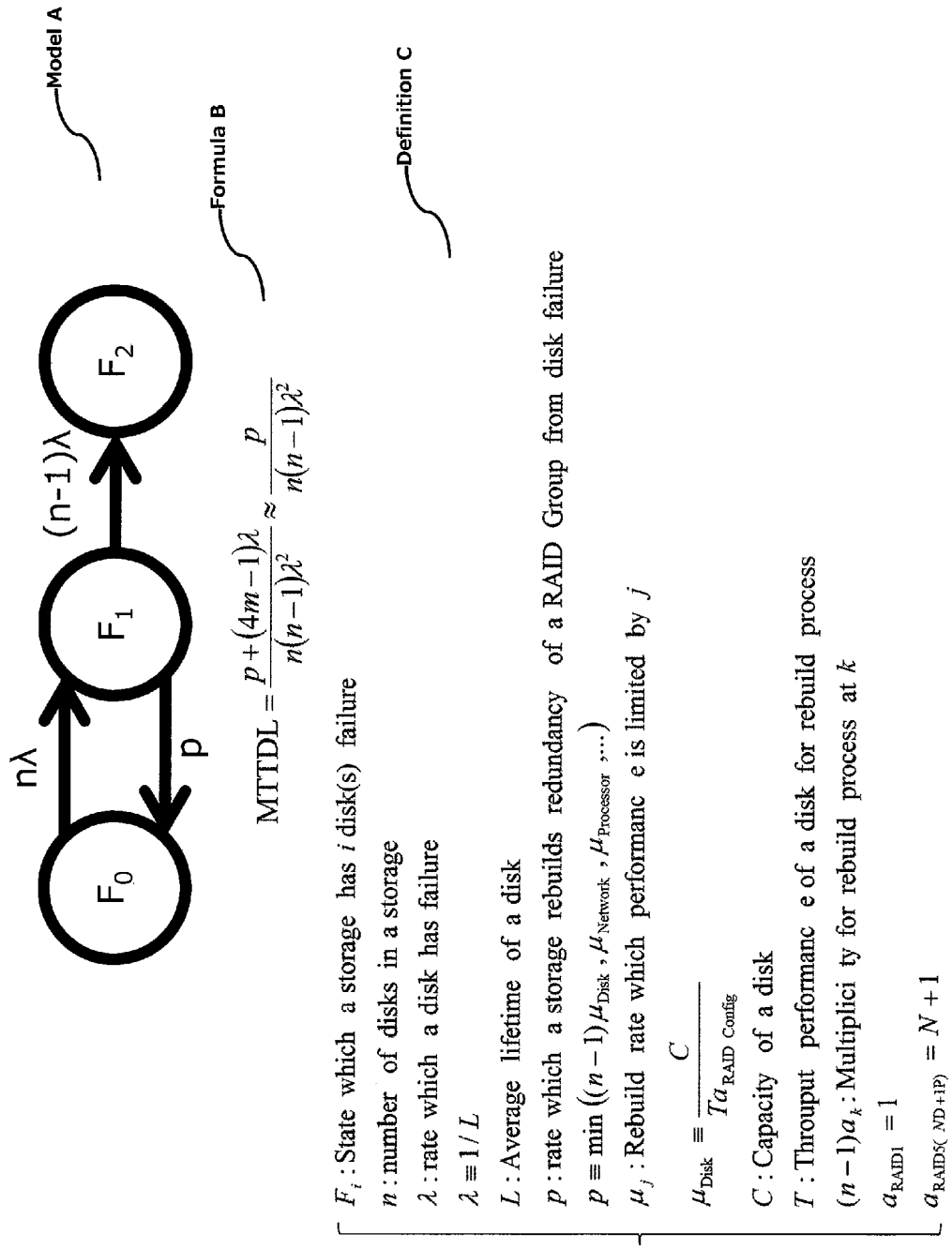
FIG. 14 illustrates a method to solve the MTTDL (Mean Time to Data Loss) of the distribution architecture.

FIG. 13 illustrates an example of the data flow by the rebuild process about one chunk when one disk 121a has failed, according to the third embodiment. The data flow is as follows. The data stored in disk 121c is transferred to the memory 112 via a corresponding disk controller 116c. The data stored in the memory 112 from disk 121c is transferred a disk 121a via a disk controller 116a. Calculation of the effective throughput performance (details of the calculation in step 112-25-5-3) is as follows. The disk controllers 116c each transfer the same capacity of the data, so that the effective throughput of each is the same as that performance. The memory 112 transfers twice of the parcel, so that the effective throughput is one half part of that performance. The disk controller 116a transfers the same capacity of the parcel, so that the effective throughput is of that performance. The whole effective throughput is the minimum value of the aforesaid effective performance of each component.

Fourth Embodiment

The fourth embodiment is based on the second and third embodiments. In this embodiment, RAID 5 and RAID 10 chunks are mixed. The effective throughput is calculated as follows $$\tilde{\omega}_{mixed} = \rho_{RAID10}\tilde{\omega}_{RAID10} + \rho_{RAID5}\tilde{\omega}_{RAID5}$$

$\rho_r$: rate of number of used chunks which is r.

A more general formula for calculating the effective throughput for mixed redundant levels or architectures is as follows $$\varpi_{mixed} = \sum_{i}^{ALL} \rho_i \varpi_i$$

$\rho_r$: rate of number of used chunks which is r.
i: redundant level or architecture.

Of course, the system configurations illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for a distribution design for fast RAID rebuild architecture. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
a data storage unit including a plurality of storage devices;
a storage controller including a processor, a memory, and a controller for controlling data transfer between the memory and corresponding storage devices in the data storage unit; and
an internal network coupled between the storage controller and the storage devices;
wherein based on loads of the processor of the storage controller and the internal network, the storage controller controls to limit a number of redundant storage devices over which to distribute a write data;
wherein the storage system calculates network bandwidth of the internal network and processor bandwidth of the processor in a rebuild process, based on performance and number of each component of the storage system except the storage devices, and calculates a maximum distribution number of redundant storage devices over which to distribute the write data based on the network bandwidth and the processor bandwidth; and
wherein the storage system compares the newly calculated maximum distribution number with a previous maximum distribution number and, if (i) the two maximum distribution numbers are different or (ii) if a current number of storage devices is different from a previous number of storage devices in the storage system and the current number is higher than the newly calculate maximum distribution number, then changes a list of pairable storage devices so that a number of pairable storage devices on the list is equal to the newly calculated maximum distribution number.

2. The storage system according to claim 1,
wherein the storage controller controls data allocation so that a distribution of storage devices is not saturated by the loads of the processor of the storage controller and the internal network in rebuilding the data.

3. The storage system according to claim 1, wherein MTTDL (Mean Time to Data Loss) is calculated by the storage controller.

4. The storage system according to claim 1, wherein the storage controller reduces the number of storage devices to distribute the write data for redundancy when the load of the internal network or the load of the storage controller increases.

5. The storage system according to claim 1, wherein the list of pairable storage devices is changed to minimize migration time and capacity for migrating data according to the pairable storage devices.

6. The storage system according to claim 1, wherein the maximum distribution number is formulated as $$N_{MAX} = \left\lfloor \frac{\varpi_r}{P_{disk}} \right\rfloor$$

$$\varpi_r = \min\left(\frac{n_k P_k}{\eta_k} \mid k: \text{each component except disk at configuration } r\right)$$

where $N_{MAX}$ is the maximum distribution number, $n_i$ is a number of the component i for the rebuild process, $p_i$ is the performance of the component i for the rebuild process, $\eta_i$ is a number of times to access the component i for the rebuild process, and r is a RAID level.

7. The storage system according to claim 6, wherein the storage controller performs rebuild control for each chunk in a broken RAID group, and wherein the rebuild control includes selecting pairable storage devices from non-failure storage devices, getting parcels of the non-failure storage devices and establishing a new chunk, copying data from the broken chunk to the new chunk, and recovering lost data for the new chunk; wherein the components include the memory, the storage controller, and the data transfer controllers involved in the rebuild control; wherein an effective throughput performance of each component is equal to a performance divided by a number of times of data transfer for the component during the rebuild control; and wherein an effective throughput is a minimum value of the effective throughput performances of all the components.

8. The storage system according to claim 6, wherein the storage controller performs rebuild control for each chunk in a broken RAID group, and wherein the rebuild control includes selecting storage devices from a list of pairable storage devices for a storage device for the unrecovered parcel, and getting a parcel from each of the selected storage devices; reading data of the parcels of the selected storage devices; and recovering lost data from the read data and storing the recovered data to a newly allocated parcel in place of the unrecovered parcel; wherein the components include the memory, the storage controller, and the data transfer controllers involved in the rebuild control; wherein an effective throughput performance of each component is equal to a performance divided by a number of times of data transfer for the component during the rebuild control; and wherein an effective throughput is a minimum value of the effective throughput performances of all the components.

9. The storage system according to claim 6, wherein the storage controller performs rebuild control for each chunk in a broken RAID group, and wherein the rebuild control includes selecting one storage device from a list of pairable storage devices for a storage device for the unrecovered parcel, and getting a parcel from the one selected storage device; reading data of the parcels of the one selected storage device; and recovering lost data from the read data and storing the recovered data to a newly allocated parcel in place of the unrecovered parcel; wherein the components include the memory, the storage controller, and the data transfer controllers involved in the rebuild control; wherein an effective throughput performance of each component is equal to a performance divided by a number of times of data transfer for the component during the rebuild control; and wherein an effective throughput is a minimum value of the effective throughput performances of all the components.

10. The storage system according to claim 1, wherein the storage devices include chunks which have different redundancy levels or architectures; wherein an effective throughput performance is calculated as follows $$\varpi_{mixed} = \sum_{i}^{ALL} \rho_i \varpi_i$$

$\rho_r$: rate of number of used chunks which is r,
i : redundant level or architecture.

11. A method of distributing data in a storage system which has a data storage unit including a plurality of storage devices; a storage controller including a processor, a memory, and a plurality of data transfer controllers for controlling data transfer between the memory and corresponding storage devices in the data storage unit; and an internal network coupled between the storage controller and the storage devices; the method comprising:

based on loads of the processor of the storage controller and the internal network, controlling to limit a number of redundant storage devices over which to distribute a write data;

calculating network bandwidth of the internal network and processor bandwidth of the processor in a rebuild process, based on performance and number of each component of the storage system except the storage devices;

calculating a maximum distribution number of redundant storage devices over which to distribute the write data based on the network bandwidth and the processor bandwidth; and comparing the newly calculated maximum distribution number with a previous maximum distribution number and, if (i) the two maximum distribution numbers are different or (ii) if a current number of storage devices is different from a previous number of storage devices in the storage system and the current number is higher than the newly calculate maximum distribution number, then changing a list of pairable storage devices so that a number of pairable storage devices on the list is equal to the newly calculated maximum distribution number.

12. The method according to claim 11, further comprising: controlling data allocation so that a distribution of storage devices is not saturated by the loads of the processor of the storage controller and the internal network in rebuilding the data.

13. The method according to claim 12, further comprising: storing MTTDL (Mean Time to Data Loss) in the memory of the storage system.

14. The method according to claim 11, further comprising: reducing the number of storage devices to distribute the write data for redundancy when the load of the internal network or the load of the storage controller increases.

15. The method according to claim 11, changing the list of pairable storage devices to minimize migration time and capacity for migrating data according to the pairable storage devices.

16. The method according to claim 11, wherein the maximum distribution number is formulated as $$N_{MAX} = \left\lfloor \frac{\varpi_r}{P_{disk}} \right\rfloor$$

$$\varpi_r = \min\left(\frac{n_k P_k}{\eta_k} \mid k: \text{ each component except disk at configuration } r\right)$$

where $N_{MAX}$ is the maximum distribution number, $n_i$ is a number of the component i for the rebuild process, $P_i$ is the performance of the component i for the rebuild process, $\eta_i$ is a number of times to access the component i for the rebuild process, and r is a RAID level.

* * * * *